(12) United States Patent
Karmi et al.

(10) Patent No.: US 12,541,380 B2
(45) Date of Patent: Feb. 3, 2026

(54) METHOD AND SYSTEM FOR MANAGING ADJUSTED CONTENT FOR END USER DEVICES

(71) Applicant: Interwise Ltd., Ben-Gurion Airport (IL)

(72) Inventors: Gilad Karmi, Kfar Yona (IL); Jacob Siegel, Mevasseret Zion (IL); Adam Yablonka, Givatayim (IL); Liran Weisbord, Heraeliya (IL)

(73) Assignee: Interwise Ltd., Ben-Gurion Airport (IL)

( * ) Notice: Subject to any disclaimer, the term of this patent is extended or adjusted under 35 U.S.C. 154(b) by 262 days.

(21) Appl. No.: 18/508,860

(22) Filed: Nov. 14, 2023

(65) Prior Publication Data
US 2025/0156200 A1    May 15, 2025

(51) Int. Cl.
*G06F 9/451* (2018.01)
*G06F 8/38* (2018.01)
*G06F 8/65* (2018.01)

(52) U.S. Cl.
CPC ............... *G06F 9/451* (2018.02); *G06F 8/38* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 11,051,067 B1* | 6/2021 | Baxter | G06Q 20/123 |
| 2015/0249720 A1* | 9/2015 | Delug | H04L 67/567 709/219 |
| 2021/0389850 A1* | 12/2021 | Charlton | G06F 3/04845 |
| 2023/0325810 A1* | 10/2023 | Barrett | G06F 9/451 |
| 2024/0338854 A1* | 10/2024 | Narayana | G06V 10/22 |

\* cited by examiner

*Primary Examiner* — Toan H Vu
(74) *Attorney, Agent, or Firm* — Guntin & Gust, PLC; Andrew Gust

(57) ABSTRACT

Aspects of the subject disclosure may include, for example, generating an adjustment request associated with a software application executable by a group of end user devices; and providing the adjustment request to the group of end user devices causing a software development kit (SDK) resident on each of the group of end user devices to present overlay content according to the adjustment request, where the overlay content is positioned over a portion of content being presented by the software application. Other embodiments are disclosed.

20 Claims, 11 Drawing Sheets

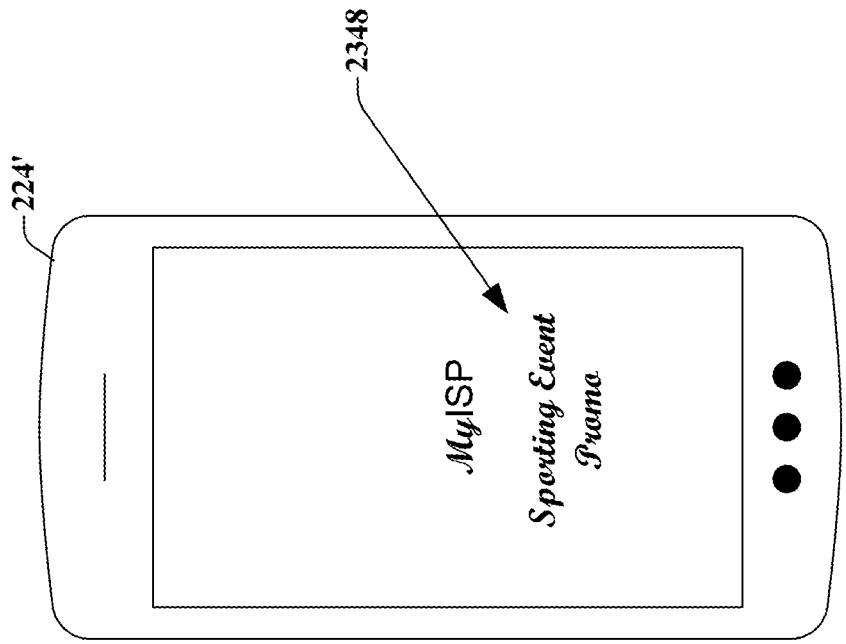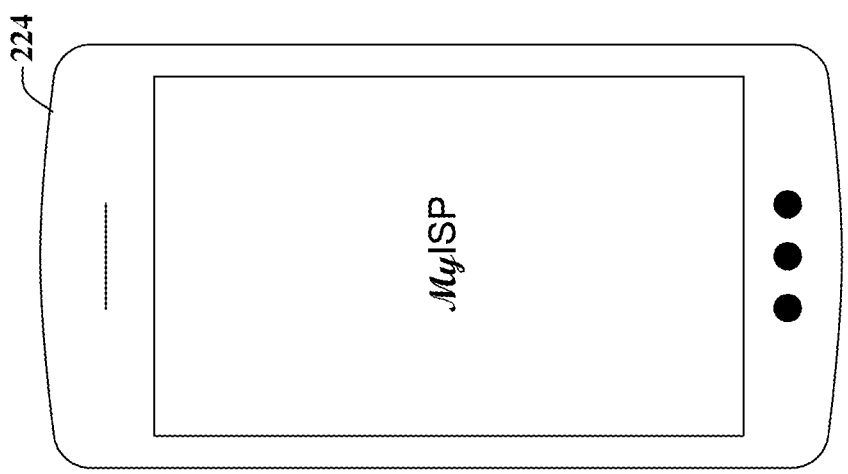
FIG. 2B

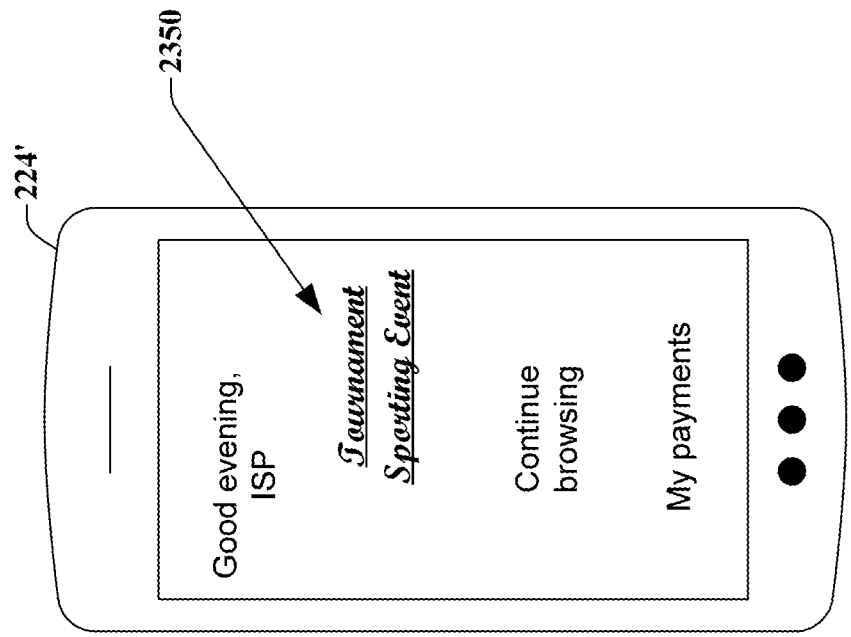
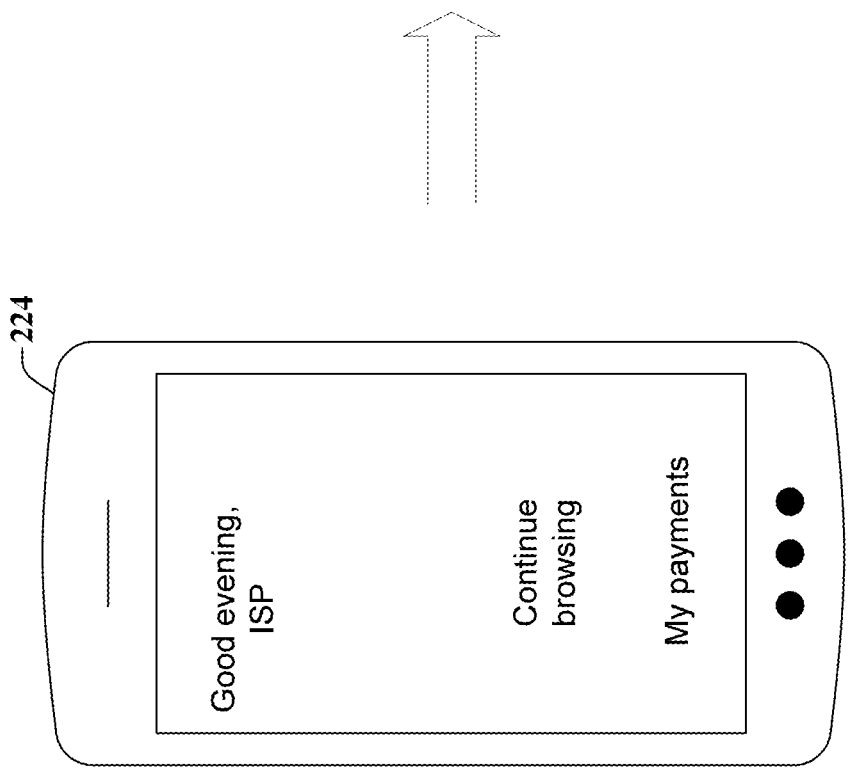
FIG. 2C

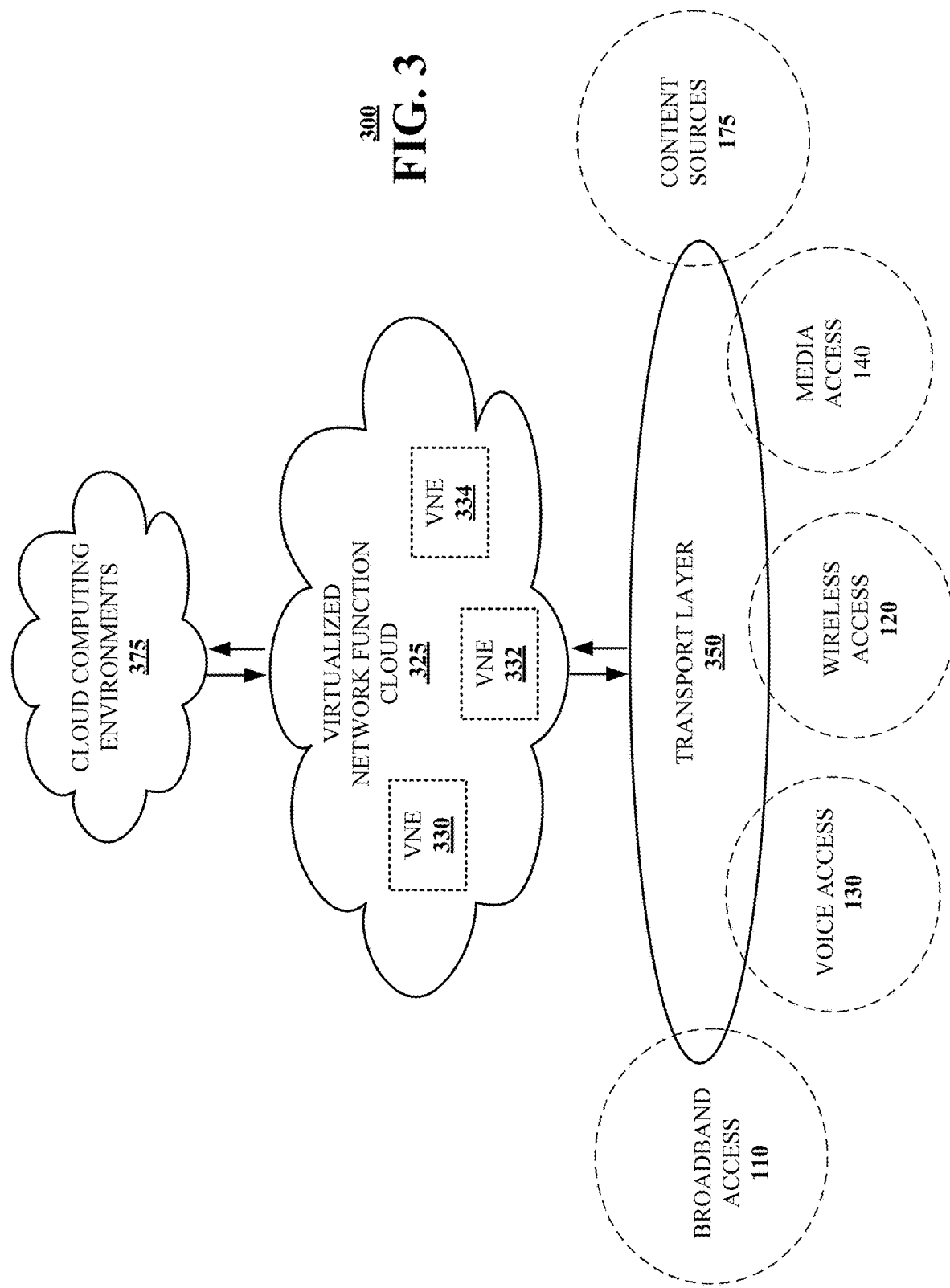

METHOD AND SYSTEM FOR MANAGING ADJUSTED CONTENT FOR END USER DEVICES

FIELD OF THE DISCLOSURE

The subject disclosure relates to a system and method for managing adjusted content for end user devices.

BACKGROUND

The development cycle for software applications and computer-implemented methods has many stages from idea to deployment, which presents difficulties to test and launch new features quickly. Furthermore, a release of an application via app stores is a process that can take time, such as a few days, and it can take even more time until users are experiencing the new version of the application. The practice of releasing apps with updates, fixes, and new features leads to many versions of the app in use by different users, which can be undesirable, particularly for a software developer. Currently, there is lacking a satisfactory technique for "on the fly" changes in mobile apps without releasing new versions.

BRIEF DESCRIPTION OF THE DRAWINGS

Reference will now be made to the accompanying drawings, which are not necessarily drawn to scale, and wherein:

FIGS. 2B-2D are block diagrams illustrating example, non-limiting embodiments of adjusted content presentation in accordance with various aspects described herein.

FIG. 3 is a block diagram illustrating an example, non-limiting embodiment of a virtualized communication network in accordance with various aspects described herein.

DETAILED DESCRIPTION

Figure 1:
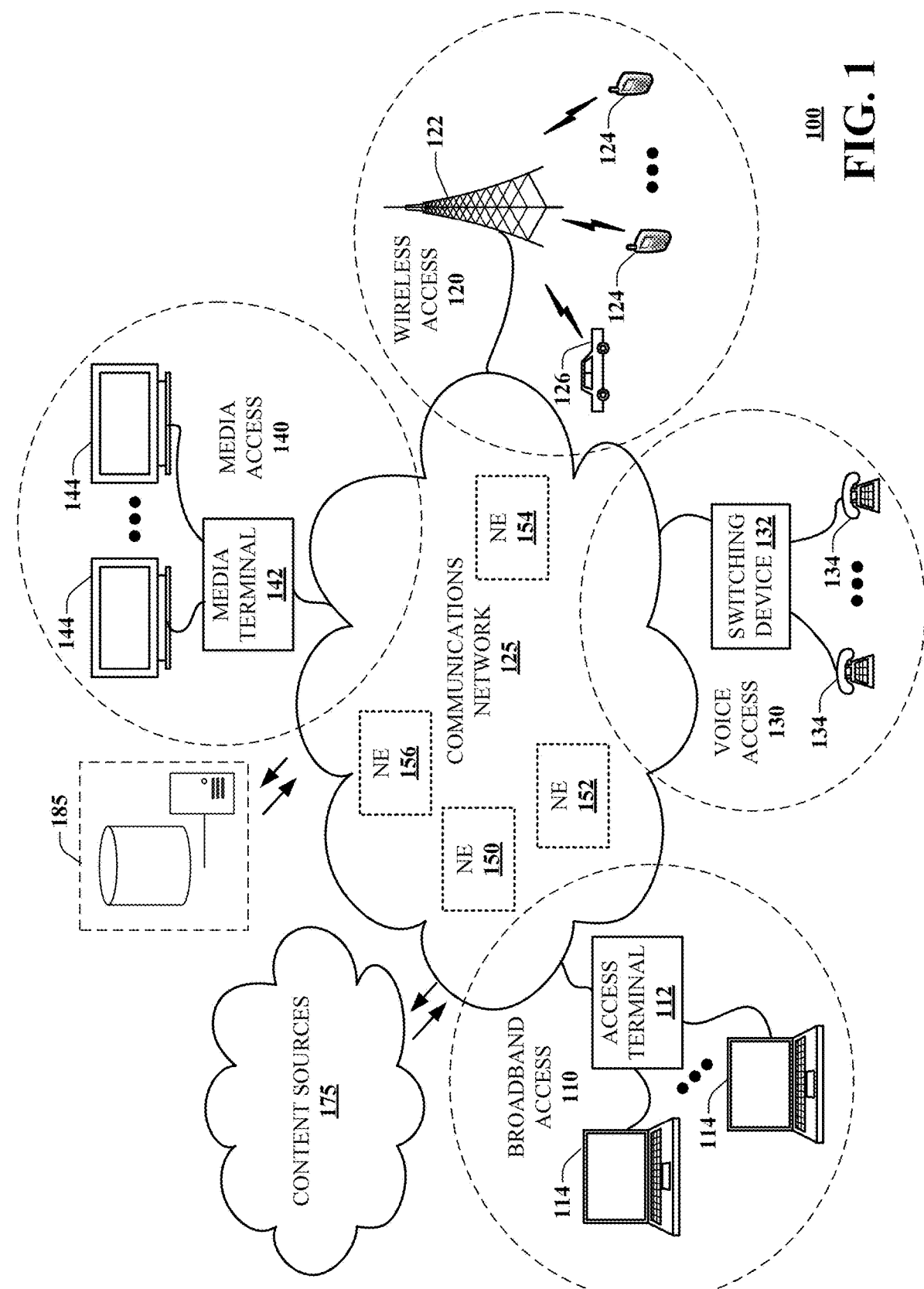
FIG. 1 is a block diagram illustrating an exemplary, non-limiting embodiment of a communications network in accordance with various aspects described herein.

The subject disclosure describes, among other things, illustrative embodiments for making adjustments to content that is presented by a software application through use of overlayed content. This can be done without altering the code being executed at the end user device(s). The adjusted or overlayed content can be of various types including multimedia, icons, active links, logos, text disclaimers, and so forth. In one or more embodiments, the overlay content can be presented at end user devices over a portion of content being presented (e.g., blocking that portion). Other embodiments are described in the subject disclosure.

In one or more embodiments, a Software Development Kit (SDK) layer (e.g., SDK code, software tool, or other software) can be provisioned to end user devices (UEs) (e.g., mobile phones, desktop computers, vehicle navigation systems, etc.) that provides a transparent layer on top of the application being executed at the UEs. In this example, a back-end layer can be provided that enables controlling or communicating with the SDK layer to provide interface modifications and interactions in conjunction with the presentation being provided by the application. In one embodiment, these modifications can be based on a rule engine (e.g., being executed at a server) and rule engine events.

In one or more embodiments, an additional or top layer (e.g., a front-end functionality at the UEs) can sit outside the code of the application, where the additional layer can be an external SDK that interacts with the code. In this example, the additional layer can be resident on each of the UEs and can interact with Native Applications, Web Applications, and/or other types of mobile apps. The front-end can show assets as an overlay above the Native Applications, Web Applications, and/or other types of mobile apps, and since it is an additional layer outside the code base and not part of the "underlayer", it is not correlated to the existing mobile app development life cycle. This enables efficient updating of this top layer code, through a back-end interface on the fly without impacting the mobile app or platform code.

In one or more embodiments, these techniques can be applied to a Service Provider's Account website. For example, interacting with the SP's mobile app through a layer that is controlled from the SP's back-end service enables responding effectively and quickly to ad-hoc/unplanned updates of the mobile app outside of the heavy development life cycle. This further enables the ability to deploy new features and capabilities to the SP's mobile app clients without having to change the client codebase, through use of an external process by an external tool.

In one or more embodiments, these techniques can be employed for marketing events, where ad-hoc solutions are needed to be deployed which involve new client releases, without going through the entire client release process. In one or more embodiments, these techniques enable identifying misconfigurations and errors, and dynamically correcting them through overlay content.

In one or more embodiments, these techniques can be utilized for introducing updates to an existing buy flow, exposing the user to new information (e.g., FCC legal messages), and/or alerting users about service degradation during a particular event.

In one or more embodiments, a group of end user devices can each be provided with a SDK or other software tool that enables a developer or other entity to make adjustments at the end user device(s) that are associated with an application being executed at the particular end user device(s). For example, the adjustments can include content overlays or user interaction functions (e.g., a selectable link) that can be placed on top of what is currently being displayed, such as content. In this example, the SDK enables an application adjustment as to what the user can see or what the user can access (e.g., a new link) without changing the software code being executed by the end user device.

In one or more embodiments, an additional layer is provided above the application or website that the end user device is executing or otherwise interacting with. For instance, this additional layer can be or can include a SDK or other software that enables overlaying content over at least a portion of the content being provided by the software application that is currently being executed without requiring an adjustment to the code of the software application.

In one or more embodiments, the SDK layer can be implemented or otherwise employed to satisfy a specific event such as a desire to publish particular information as soon as possible at a mobile device(s). For example, this publication can be to correct an error that has been detected (e.g., a location application that indicates a point of interest which is now closed or is now no longer at the location, a bug in a link, and so forth).

In one or more embodiments, the back-end layer that interacts with the SDKs of each of the UEs can be in the cloud, in a server(s) or located at another computing device(s). In one or more embodiments, the interaction of the back-end layer with the SDKs of each of the UEs enables global changes to the UEs without the delays of a software development update.

In one or more embodiments, the software application can be developed by a developer utilizing an SDK and modification or adjustments can be made during execution of the software applications as described herein including the SDK of the developer interacting with another SDK resident on each of the UEs. This interaction will enable content to be presented at the UEs in combination with the content being presented by the software application without changing the code of the software application.

In one or more embodiments, the back-end layer can communicate with the SDKs of each of the UEs to make a content adjustment at the UEs in the event that a bug or other undesirable presentation is occurring at the UEs. The content adjustment can include overlay content that can cover portions of the undesirable presentation, such as covering an out-of-date disclaimer with a current disclaimer, and so forth on the display of the UEs. In one embodiment, the content adjustment can include overlaying a particular link on the display so that the user can navigate away from the software application or to a different webpage that may be associated with the software application.

In one or more embodiments, adjustment information (e.g., in an adjustment request) being sent to the SDKs of the UEs can include position information for where the overlay content is to be displayed with respect to the screen of the UEs and/or with respect to the currently presented content. In one or more embodiments, this position information can include areas of the currently presented content that are not to be covered or otherwise obscured. In one or more embodiments, the back-end layer can obtain user input that designates or otherwise provides the overlay content and/or designates the position information for the overlay content. In one or more embodiments, the back-end layer can have knowledge of, or otherwise be provided with, the structure (e.g., dimensions and/or shape) of UE display or page that will be presented and which can be overlayed by the overlay content.

In one or more embodiments, the back-end layer can have knowledge of, or otherwise be provided with, the structure (e.g., dimensions and/or shape) of objects that will be presented and which can be overlayed by the overlay content, such as overlaying one icon or logo on top of another icon or logo.

In one or more embodiments, the adjustment information being provided to the SDKs of the UEs can include time information for when the overlay content is to be displayed. In one or more embodiments, the adjustment information being provided to the SDKs of the UEs can be of different formats that are compatible with different operating systems of the UEs.

In one or more embodiments, hashing can be utilized with use of the SDKs of each UE to monitor which UEs have been updated for presenting the overlay content. In one or more embodiments, the source of the adjusted content can be the developer or can be a service provider providing communication services for the UEs.

In one or more embodiments, the back-end layer in conjunction with the SDKs can be utilized for adjustments to advertising that is being presented during execution of a software application. For example, if an advertising platform determines it needs to change a disclaimer shown with the advertising then the adjustment information can be utilized for such a change. In this example, the source of the adjustment can be the advertising platform (rather than the software developer) that can access the back-end layer. In one or more embodiments, the back-end layer can have knowledge of where the advertising is positioned on the display screen or with respect to the currently presented content of the software application, and can provide instructions to the SDKs as to where to position the overlay content (which will overlay a portion of the advertising).

In one or more embodiments, the overlay content can be sourced by various entities. For example, the overlay content can be a pool of advertisements, logos, etc. that are available to be positioned on the display. In one or more embodiments, an advertisement can be selected from the pool to replace another advertisement, such as if a rules engine determines that the original intended advertisement is not to be presented (e.g., violates a rule such as subject matter conflict, inappropriate timing, etc.). In one or more embodiments, the pool of advertising can be selected from a content management system. In one or more embodiments, adjusting of the advertising content can be done by way of authorization or permission of multiple entities, such as an advertising platform requesting that the ISP select one of a pool of advertisements to be overlayed on the content and doing so with the permission or authorization of the software developer.

In one or more embodiments, a single SDK on a UE can be utilized for more than one software application which may be associated with a single developer or multiple different developers.

One or more aspects of the subject disclosure include an end user device, comprising: a display; a processing system including a processor, and a memory that stores executable instructions that, when executed by the processing system, facilitate performance of operations. The operations can include executing a software application that is stored in the memory; and presenting content on the display based on the executing of the software application. The operations can include receiving, over a network, an adjustment request from a server; providing adjustment information from the adjustment request to a SDK that is resident on the end user device; and presenting overlay content on the display according to the SDK and according to the adjustment information, wherein the overlay content is positioned over a portion of the content.

One or more aspects of the subject disclosure a method, including generating, by a processing system including a processor, an adjustment request associated with a software application executable by a group of end user devices. The method can include providing, by the processing system, the adjustment request to the group of end user devices causing a software tool resident on each of the group of end user devices to present overlay content according to the adjustment request, where the overlay content is positioned over a portion of content being presented by the software application.

One or more aspects of the subject disclosure include a non-transitory machine-readable medium, comprising executable instructions that, when executed by a processing system including a processor of an end user device, facilitate performance of operations. The operations can include operating as a SDK for one or more software applications of the end user device; and receiving, over a network, an adjustment request from a server. The operations can include presenting overlay content on a display of the end user device according to the adjustment request, where the overlay content is positioned over a portion of content while the content is being displayed on the display by the software application.

Referring now to FIG. 1, a block diagram is shown illustrating an example, non-limiting embodiment of a system 100 in accordance with various aspects described herein. System 100 can include an adjustment platform 185 that facilitates managing SDKs resident on end user devices and facilitates adjustments that are made at the end user devices where the adjustments are associated with applications being executed at the end user devices. For example, system 100 can facilitate in whole or in part generating an adjustment request associated with a software application executable by a group of end user devices; and providing the adjustment request to the group of end user devices causing a SDK resident on each of the group of end user devices to present overlay content according to the adjustment request, where the overlay content is positioned over a portion of content being presented by the software application.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11 In, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
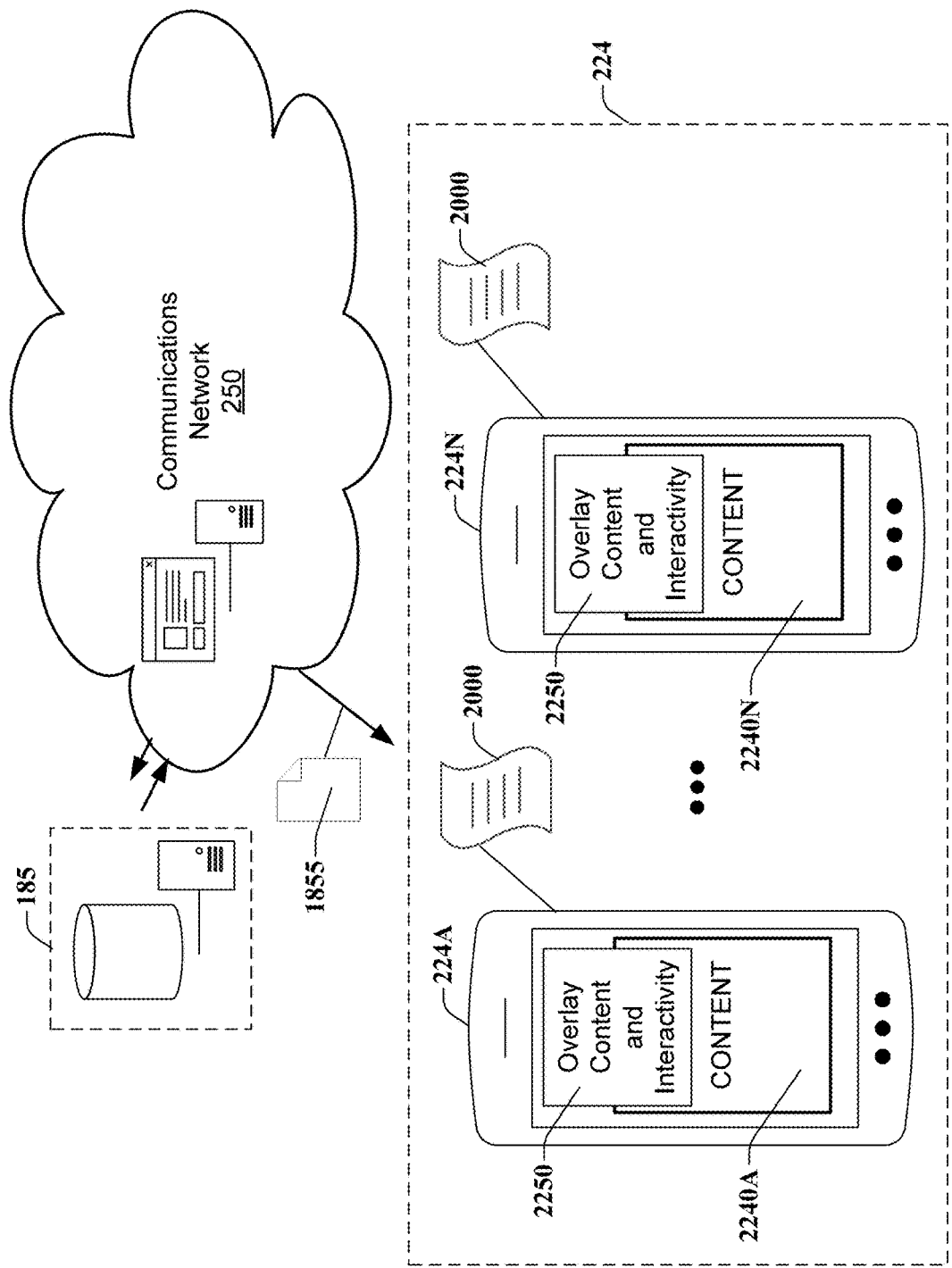
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 can include the adjustment platform 185 (e.g., server(s), cloud, etc.) that facilitates managing SDKs 2000 resident on end user devices 224 and that facilitates adjustments which are made at the end user devices where the adjustments are associated with applications being executed at the end user devices. For example, system 200 can facilitate in whole or in part generating an adjustment request 1855 associated with a software application executable by the end user devices 224. System 200 can provide the adjustment request 1855 to the end user devices 224 causing the SDKs 2000 resident on each of the end user devices to present overlay content 2250 according to the adjustment request, where the overlay content is positioned over a portion of content 2240 being presented by the software applications at each of the end user devices. It should be understood that in other embodiments, the software resident on the UEs can be various types of software which enable positioning the overlay content on the display of the UEs while the UEs are presenting other content from the software applications. In one or more embodiments, system 200 enables a global change to be made to each of the UEs 224, such as when the software application is initialized or while it is being executed.

In one or more embodiments, the end user devices 224 can include a display; a processing system including a processor, and a memory that stores executable instructions that, when executed by the processing system, facilitate performance of operations. The operations of the UEs 224 can include executing a software application that is stored in the memory; presenting content on the display based on the executing of the software application; receiving, over a network, an adjustment request from a server (e.g., platform 185 or another computing device); providing adjustment information from the adjustment request to the SDK 2000 that is resident on the UE; and presenting overlay content 2250 on the display according to the SDK and according to the adjustment information, where the overlay content is positioned over a portion of the content 2240.

In one or more embodiments, the adjustment request is generated at the platform/server 185 according to user input associated with an entity managing the software application. In one or more embodiments, the user input is a selection from among a group of overlay contents, where the server is operated by a service provider managing the network, and where the server is accessible to the entity managing the software application.

Figure 2D:
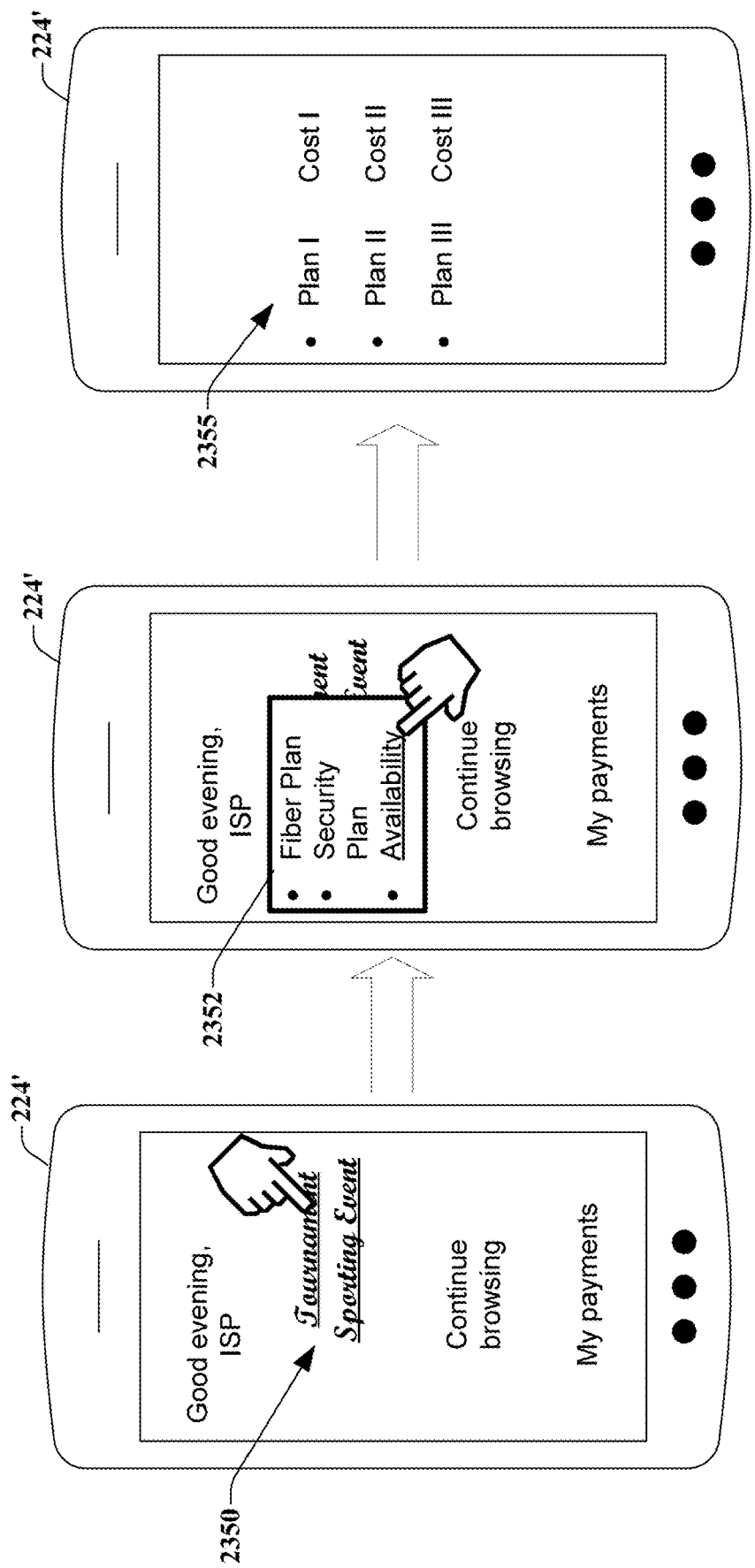

In one or more embodiments illustrated in FIGS. 2B-2D, the difference between unadjusted content and adjusted content is shown between unadjusted end user device 224 and adjusted end user device 224'. The unadjusted UE 224 can execute a software application (e.g., that is stored in whole or in part in the memory of the UE) which can include presenting content on the display based on the executing of the software application (e.g., myISP log-in page). However, the embodiments described herein enable, as shown for adjusted UE 224' in FIG. 2B, presentation of the overlay content 2348 (Sporting Event Promo) over a portion of the original content. In this example, the overlay content can be designated (e.g., via selection at the back-end layer when the adjustment request is being generated) to be positioned under the myISP icon (or elsewhere) so as not to obscure this original content icon. As described herein, the adjustment information from the adjustment request is received by the SDK that is resident on the UE 224' and causes presenting the overlay content of Sporting Event Promo, without needing to change or alter the software code being executed to generate the myISP log-in page.

Continuing with this example in FIG. 2C, the unadjusted UE 224 can continue to execute the software application and can present content on the display which is depicted as a greeting page with links to browsing and payment pages. However, the embodiments described herein enable, as shown for adjusted UE 224', presentation of the overlay content 2350 (Tournament Sporting Event) over a portion of the original content. In this example, the overlay content 2350 can be designated (e.g., via selection at the back-end layer when the adjustment request is being generated) to be positioned under the greeting text (or elsewhere) so as not to obscure this original content icon or the original links (e.g., browsing or payment links). As described herein, the adjustment information from the adjustment request is received by the SDK that is resident on the UE and causes presenting the overlay content of Tournament Sporting Event, without needing to change or alter the software code being executed to generate the greeting page. In this example, the overlay content 2350 can be a button or link for a drop-down window or other information window (which may or may not be affiliated with the software application being executed).

Continuing with this example in FIG. 2D, the adjusted UE 224' enables selection of the button in the overlay content 2350 which results in presentation of additional overlay content 2352 (e.g., service package plan information window) over a portion of the original content. In this example, the overlay content 2352 can be designated (e.g., via selection at the back-end layer when the adjustment request is being generated) to be positioned under the greeting text (or elsewhere) and over a portion of the earlier overlay content 2350 so as not to obscure this original content icon or the original links (e.g., browsing or payment links). As described herein, the adjustment information from the adjustment request is received by the SDK that is resident on the UE and causes presenting the overlay content 2352 of service package plan information window, without needing to change or alter the software code being executed to generate the greeting page. In this example, the overlay content 2352 can include a link to a webpage 2355 (which may or may not be affiliated with the software application being executed). For example, selection of the Availability link in the window 2352 can navigate the user to a webpage 2355 that includes details and/or purchasing options for the service plans. Various other overlay content and combinations of overlay content can be used which can be multimedia, links, drop-down menus, logs, advertising, and so forth.

Figure 2E:
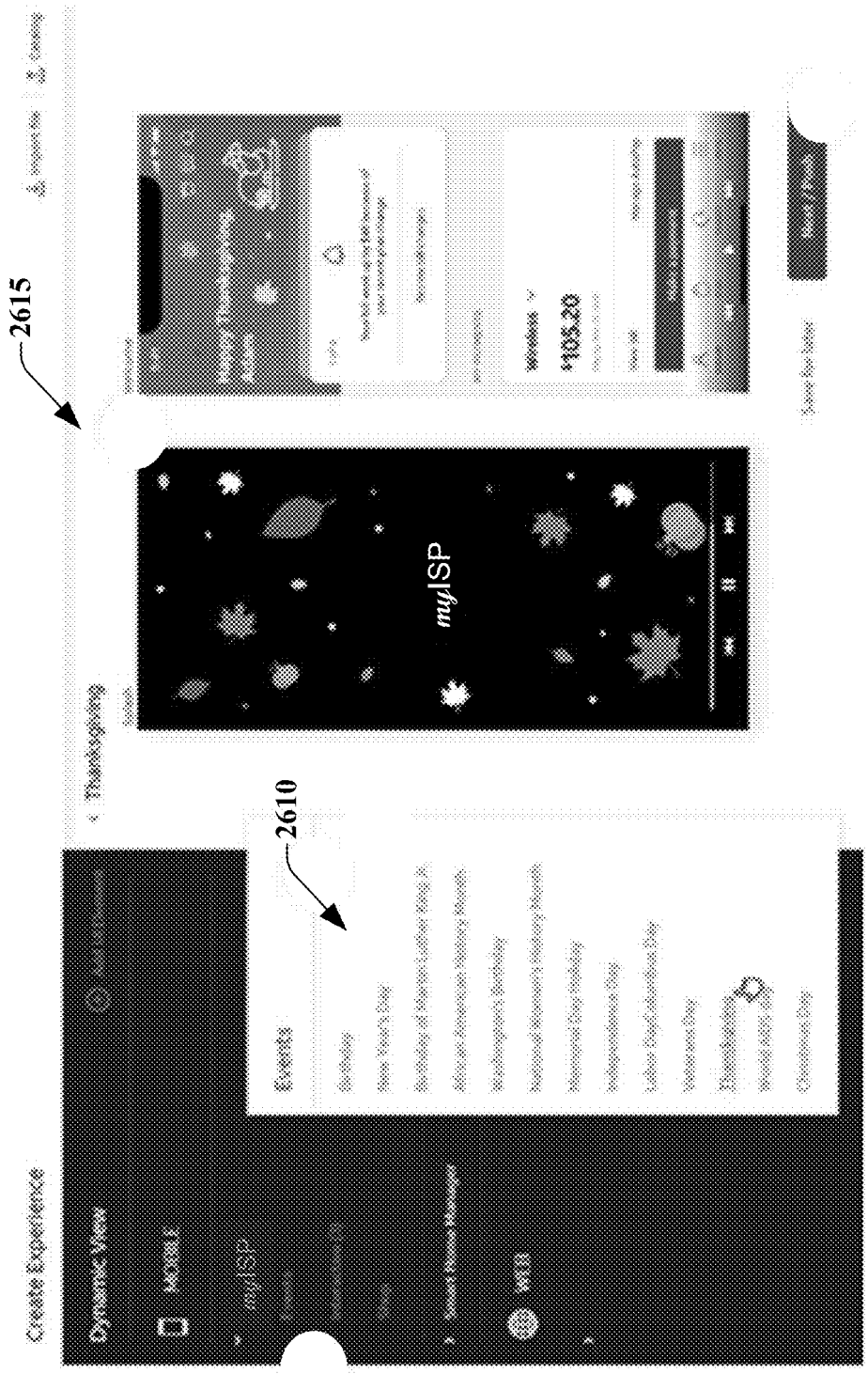
FIG. 2E is a block diagram illustrating an example, non-limiting embodiment of a graphical user interface in accordance with various aspects described herein.

In one or more embodiments illustrated in FIG. 2E, a back-end graphical user interface 260 is illustrated. GUI 260 can include a list of content options 2610 to choose from to present on top of the mobile app as an overlay. For instance, selecting "Thanksgiving" at the GUI 260 causes generation of adjustment information resulting in pushing the "Thanksgiving" design and rules activation (e.g., only at the day of the event, and only once for new customers) to the SDKs of the UEs for immediate change to such as to all of the customer base. GUI 260 can further include a preview 2615 showing the effect of the chosen option (e.g., feature, event, design or action) on the mobile app interface, which in this example shows falling leaves on a welcome splash screen when the app loads, as well as leaves and a roasted turkey icon on the header of the welcome screen.

Figure 2F:
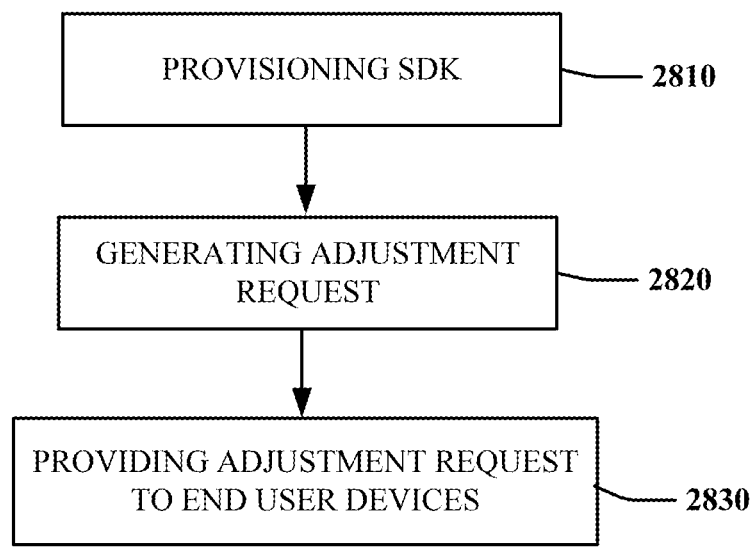
FIG. 2F depicts an illustrative embodiment of a method in accordance with various aspects described herein.

FIG. 2F depicts an illustrative embodiment of a method 280 in accordance with various aspects described herein. At 2810, SDKs can be installed at any number of UEs, such as via an Over-The-Air provisioning process. At 2820, an adjustment request can be generated. This can be done in a number of different ways including at a back-end server that is accessible to a developer of the software application being executed by the number of UEs. At 2830, the adjustment request can be provided over a network to the UEs. For example, the adjustment request can include adjustment information that is received by the SDKs resident on the UEs which enables the SDKs to present overlay content on a display of each of the UEs according to the adjustment request, where the overlay content is positioned over a portion of content while the content is being displayed on the display by the software application of the UE. In one embodiment, the adjustment request includes the overlay content and a position on a display where the overlay content is to be displayed. In one embodiment, the adjustment request includes the overlay content and one or more positions corresponding to the content where the overlay content is not to be displayed. In one embodiment, the overlay content includes a link that enables a user to navigate to a website. In one embodiment, the adjustment request is generated based on user input associated with an entity managing the software application.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of FIGS. 1, 2A-2F, and 3. For example, virtualized communication network 300 can facilitate in whole or in part generating an adjustment request associated with a software application executable by a group of end user devices; and providing the adjustment request to the group of end user devices causing a SDK resident on each of the group of end user devices to present overlay content according to the adjustment request, where the overlay content is positioned over a portion of content being presented by the software application.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
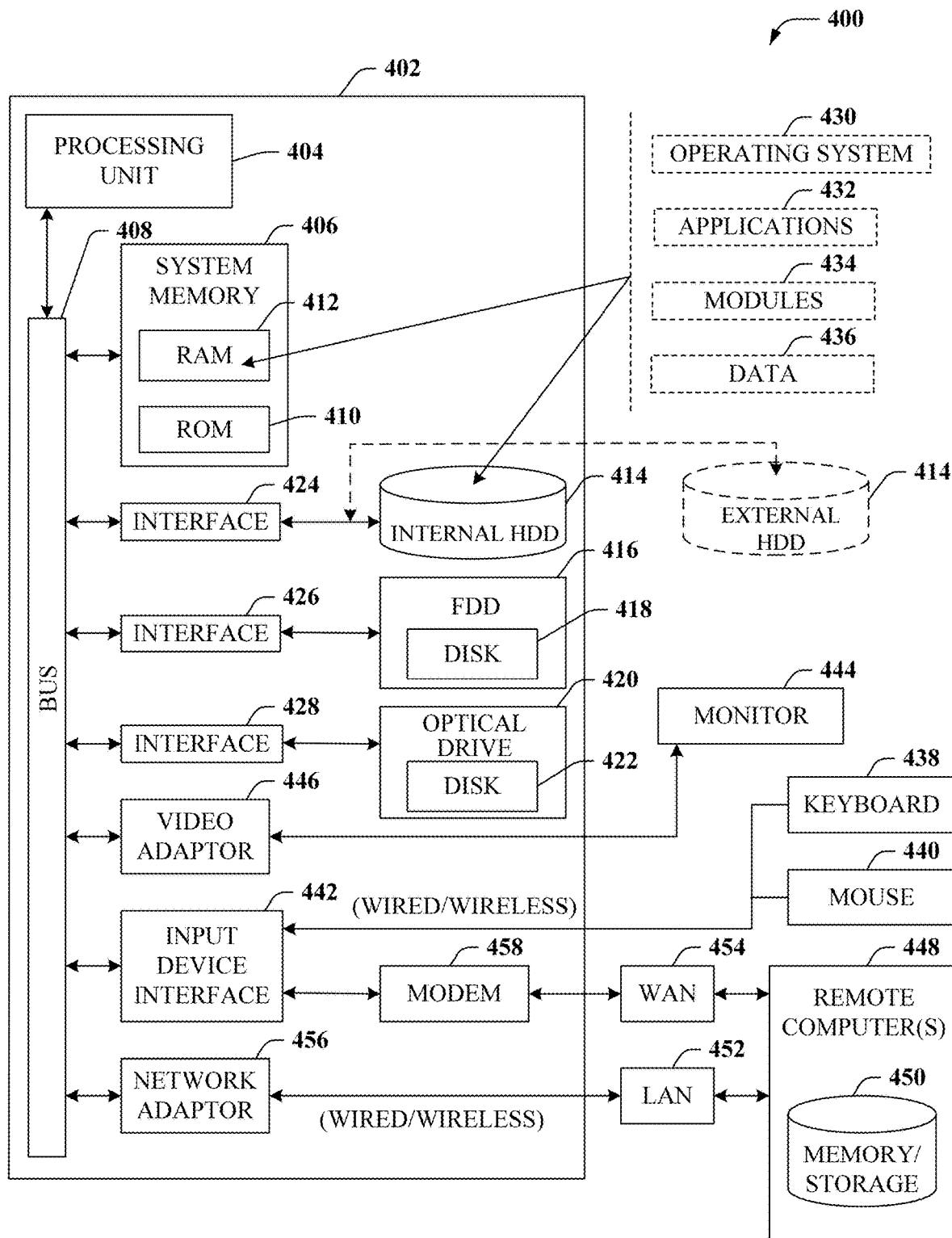
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part generating an adjustment request associated with a software application executable by a group of end user devices; and providing the adjustment request to the group of end user devices causing a SDK resident on each of the group of end user devices to present overlay content according to the adjustment request, where the overlay content is positioned over a portion of content being presented by the software application.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
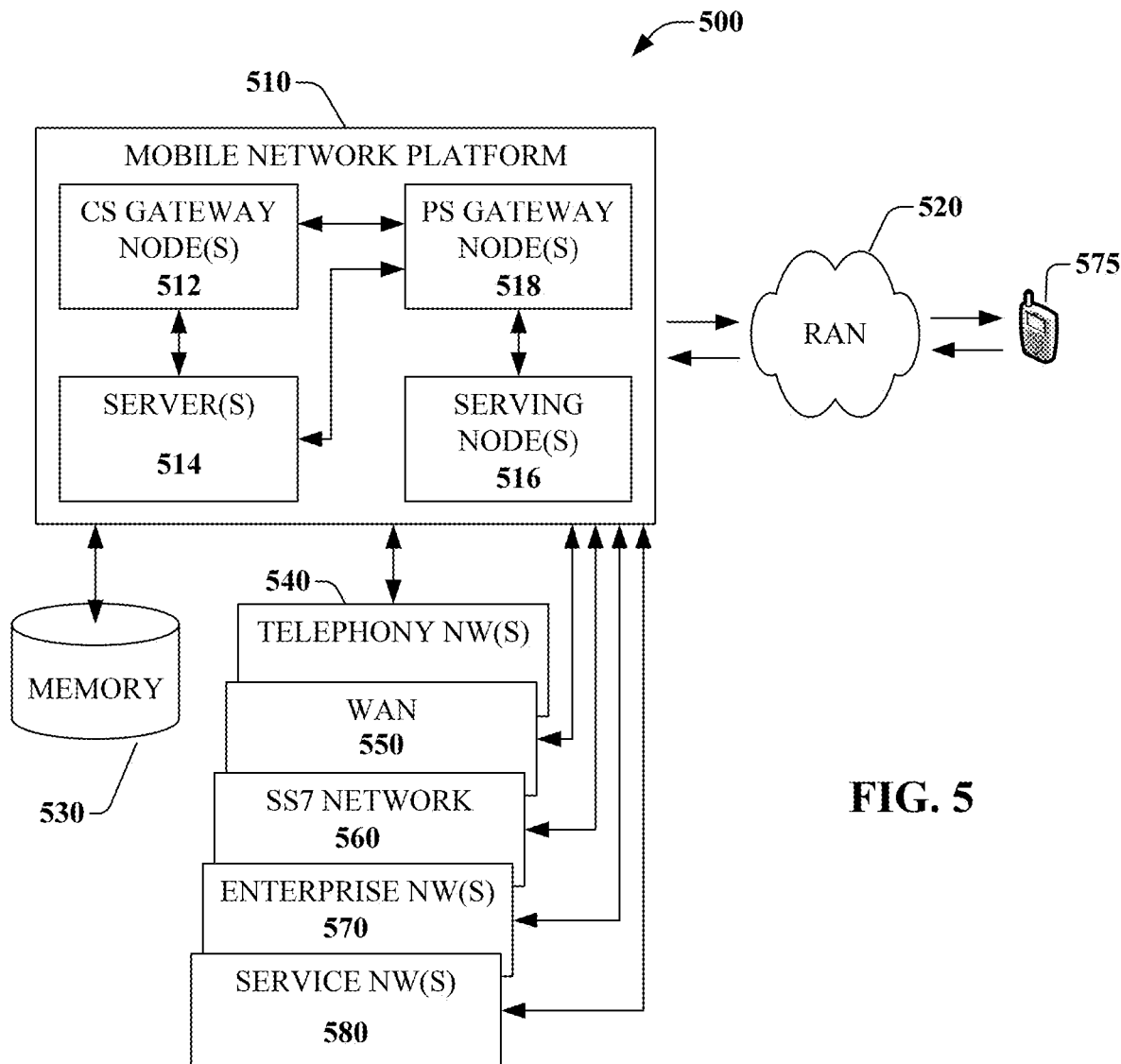
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part generating an adjustment request associated with a software application executable by a group of end user devices; and providing the adjustment request to the group of end user devices causing a SDK resident on each of the group of end user devices to present overlay content according to the adjustment request, where the overlay content is positioned over a portion of content being presented by the software application. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate muting of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
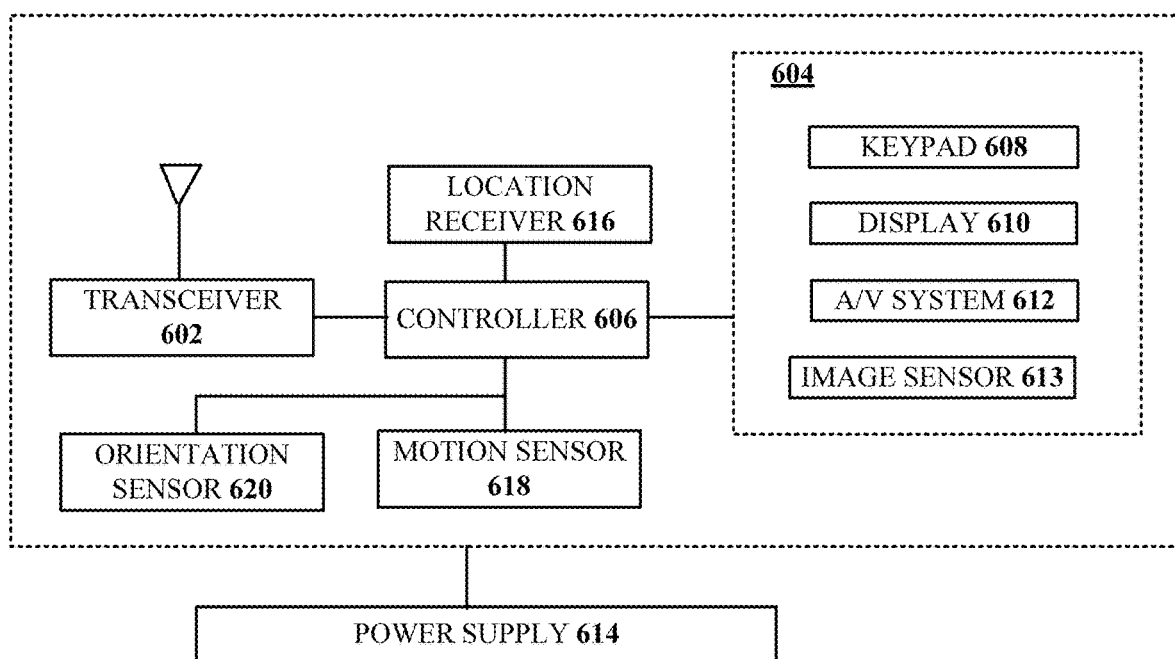
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part generating an adjustment request associated with a software application executable by a group of end user devices; and providing the adjustment request to the group of end user devices causing a SDK resident on each of the group of end user devices to present overlay content according to the adjustment request, where the overlay content is positioned over a portion of content being presented by the software application.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via a observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An end user device, comprising:
a display;
a processing system including a processor, and
a memory that stores executable instructions that, when executed by the processing system, facilitate performance of operations, the operations comprising:
executing a software application that is stored in the memory;
presenting content on the display based on the executing of the software application;
receiving, over a network, an adjustment request from a server;
providing adjustment information from the adjustment request to a Software Development Kit (SDK) that is resident on the end user device; and
presenting overlay content on the display according to the SDK and according to the adjustment information, wherein the overlay content is positioned over a portion of the content.

2. The end user device of claim 1, wherein the adjustment request includes the overlay content and a position on the display where the overlay content is to be displayed.

3. The end user device of claim 1, wherein the adjustment request includes the overlay content and one or more positions corresponding to the content where the overlay content is not to be displayed.

4. The end user device of claim 1, wherein the overlay content includes a link that enables a user to navigate to a website.

5. The end user device of claim 1, wherein the SDK is obtained via an Over-The-Air provisioning process prior to the receiving of the adjustment request.

6. The end user device of claim 1, wherein the adjustment request is generated at the server according to user input associated with an entity managing the software application.

7. The end user device of claim 6, wherein the user input is a selection from among a group of overlay contents, wherein the server is operated by a service provider managing the network, and wherein the server is accessible to the entity managing the software application.

8. A method, comprising:
generating, by a processing system including a processor, an adjustment request associated with a software application executable by a group of end user devices; and
providing, by the processing system, the adjustment request to the group of end user devices causing a software tool resident on each of the group of end user devices to present overlay content according to the adjustment request, wherein the overlay content is positioned over a portion of content being presented by the software application.

9. The method of claim 8, wherein the adjustment request includes the overlay content and a position on a display where the overlay content is to be displayed.

10. The method of claim 8, wherein the adjustment request includes the overlay content and one or more positions corresponding to the content where the overlay content is not to be displayed.

11. The method of claim 8, wherein the overlay content includes a link that enables a user to navigate to a website.

12. The method of claim 8, comprising: initiating, by the processing system an Over-The-Air provisioning process of the software tool to each of the group of end user device prior to the providing of the adjustment request.

13. The method of claim 8, comprising: receiving, by the processing system, user input associated with an entity managing the software application.

14. The method of claim 13, wherein the user input is a selection from among a group of overlay contents, wherein the processing system is operated by a service provider managing a network over which the adjustment request is provided to the group of end user devices.

15. A non-transitory machine-readable medium, comprising executable instructions that, when executed by a processing system including a processor of an end user device, facilitate performance of operations, the operations comprising:
operating as a Software Development Kit (SDK) for one or more software applications of the end user device;
receiving, over a network, an adjustment request from a server; and
presenting overlay content on a display of the end user device according to the adjustment request, wherein the overlay content is positioned over a portion of content while the content is being displayed on the display by the software application.

16. The non-transitory machine-readable medium of claim 15, wherein the adjustment request includes the overlay content and a position on a display where the overlay content is to be displayed.

17. The non-transitory machine-readable medium of claim 15, wherein the adjustment request includes the overlay content and one or more positions corresponding to the content where the overlay content is not to be displayed.

18. The non-transitory machine-readable medium of claim 15, wherein the overlay content includes a link that enables a user to navigate to a website.

19. The non-transitory machine-readable medium of claim 15, wherein the SDK is installed at the end user device via an Over-The-Air provisioning process.

20. The non-transitory machine-readable medium of claim 15, wherein the adjustment request is generated based on user input associated with an entity managing the software application.

* * * * *